(12) United States Patent
Tavakoli et al.

(10) Patent No.: US 10,482,648 B2
(45) Date of Patent: Nov. 19, 2019

(54) SCENE-BASED FOVEATED RENDERING OF GRAPHICS CONTENT

(71) Applicant: QUALCOMM Incorporated, San Diego, CA (US)

(72) Inventors: Mehrad Tavakoli, San Diego, CA (US); Moinul Khan, San Diego, CA (US); Martin Renschler, San Diego, CA (US); Mriganka Mondal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 15/377,488

(22) Filed: Dec. 13, 2016

(65) Prior Publication Data

US 2018/0165792 A1 Jun. 14, 2018

(51) Int. Cl.
*G06T 15/00* (2011.01)
*G06F 3/01* (2006.01)
*G06K 9/00* (2006.01)
*G06T 3/00* (2006.01)

(52) U.S. Cl.
CPC ............. *G06T 15/00* (2013.01); *G06F 3/013* (2013.01); *G06K 9/00597* (2013.01); *G06T 3/0012* (2013.01); *G06T 2210/36* (2013.01)

(58) Field of Classification Search
CPC ................................ G06T 17/20; G06T 15/00
USPC ....................................................... 345/428
See application file for complete search history.

(56) References Cited

U.S. PATENT DOCUMENTS

| 6,252,989 | B1 | 6/2001 | Geisler et al. | |
|---|---|---|---|---|
| 6,525,989 | B2* | 2/2003 | Mizugaki | G11C 8/08 365/230.01 |
| 2002/0180756 | A1* | 12/2002 | Lee | H04N 19/89 345/619 |
| 2009/0185748 | A1* | 7/2009 | Kortum | H04N 19/162 382/232 |

(Continued)

OTHER PUBLICATIONS

Bokani A., et al., "Predicting the Region of Interest for Dynamic Foveated Streaming", IEEE, International Telecommunication Networks and Applications Conference (ITNAC), 2015, pp. 1-6.

(Continued)

*Primary Examiner* — Jin Ge
(74) *Attorney, Agent, or Firm* — Toler Law Group, P.C.

(57) ABSTRACT

An apparatus is configured to render graphics content to reduce latency of the graphics content. The apparatus includes a display configured to present graphics content including a first portion corresponding to an area of interest and further including a second portion. The apparatus further includes a fovea estimation engine configured to generate an indication of the area of interest based on scene information related to the graphics content. The apparatus further includes a rendering engine responsive to the fovea estimation engine. The rendering engine is configured to perform a comparison of a first result of an evaluation metric on part of the area of interest with a second result of the evaluation metric with another part of the area of interest. The rendering engine is further configured to render the graphics content using predictive adjustment to reduce latency based on the comparison.

30 Claims, 9 Drawing Sheets

(56) References Cited

U.S. PATENT DOCUMENTS

| | | | |
|---|---|---|---|
| 2010/0046827 A1* | 2/2010 | Anderson | G06K 9/00778 382/141 |
| 2010/0100548 A1 | 4/2010 | Scott et al. | |
| 2011/0154307 A1* | 6/2011 | Upton | G06T 11/40 717/146 |
| 2014/0226722 A1 | 8/2014 | Izvorski et al. | |
| 2015/0070357 A1 | 3/2015 | Tahan | |
| 2015/0142884 A1 | 5/2015 | Veramendi | |
| 2015/0268821 A1* | 9/2015 | Ramsby | G06F 3/013 715/765 |
| 2015/0302546 A1* | 10/2015 | Balci | G06T 1/20 345/522 |
| 2016/0163014 A1 | 6/2016 | Yang et al. | |
| 2017/0038837 A1* | 2/2017 | Faaborg | G06F 3/0482 |
| 2017/0124760 A1* | 5/2017 | Murakawa | G06T 17/20 |

OTHER PUBLICATIONS

Gide M.S., et al., "Improved Foveation- and Saliency-Based Visual Attention Prediction Under a Quality Assessment Task", IEEE, Fourth International Workshop on Quality of Multimedia Experience (QoMEX), 2012, pp. 1-6.

Guenter B., et al., "Foveated 3D Graphics", Proceedings ACM SIGGRAPH Asia, Nov. 20, 2012, 10 Pages.

Gupta K., et al., "Dynamic Eye Gaze Tracking for Foveated Rendering and Retinal Blur", Dec. 2015, 6 Pages.

Judd T., et al., "Learning to Predict Where Humans Look", International Conference on Computer Vision (ICCV), 2009, 8 Pages.

QUALCOMM: "Keeping the Virtual World Stable in VR", OnQ Blog, Jun. 29, 2016, Retrieved from internet on Nov. 16, 2016, URL: https://www.qualcomm.com/news/onq/2016/06/29/keeping-virtual-world-stable-vr, pp. 1-9.

Swafford N.T., et al., "User, Metric, and Computational Evaluation of Foveated Rendering Methods", Proceedings of the ACM Symposium on Applied Perception, Jul. 2016, pp. 7-14.

Unity Technologies: "Draw Call Batching", Publication May 4, 2016, 3 Pages.

Wikipedia: "Application Programming Interface", Retrieved from internet on Nov. 16, 2016, URL: https://en.wikipedia.org/wiki/Application_programming_interface, pp. 1-7.

Wikipedia: "Graphics Pipeline", Aug. 2016, 7 Pages.

Wikipedia: "OpenGL ES", Retrieved from internet on Nov. 16, 2016, URL: https://en.wikipedia.org/wiki/OpenGL_ES, pp. 1-8.

* cited by examiner

SCENE-BASED FOVEATED RENDERING OF GRAPHICS CONTENT

I. FIELD

This disclosure is generally related to electronic devices and more particularly to rendering of graphics content by electronic devices.

II. DESCRIPTION OF RELATED ART

An electronic device may execute a program to present graphics at a display. For example, an electronic device may execute a virtual reality (VR) program or an augmented reality (AR) program.

The program may specify one or more drawcalls indicating a set of parameters used to process the graphics content. For example, a graphics processor may render graphics content using triangles to represent objects (e.g., by using two triangles to represent a square shape), and a drawcall may specify a set of triangles associated with a particular object of the graphics content.

In some applications, graphics presented at a display may be foveated. In this case, one or more particular graphics portions may be rendered using higher resolution or more detail than one or more other graphics portions (e.g., background content).

An electronic device may track gaze of a user (e.g., using a sensor) to identify a graphics portion to be foveated. For example, if the electronic device determines that eye movement of the user follows a particular object presented at a display, the electronic device may foveate the object. In some cases, tracking error or latency may cause the electronic device to incorrectly track the gaze of the user. As a result, foveated rendering of graphics may be inaccurate in some circumstances (e.g., due to tracking error, latency, or both).

III. SUMMARY

In an illustrative example, an apparatus is configured to render graphics content to reduce latency of the graphics content. The apparatus includes a display configured to present graphics content including a first portion corresponding to an area of interest and further including a second portion. The apparatus further includes a fovea estimation engine configured to generate an indication of the area of interest based on scene information related to the graphics content. The apparatus further includes a rendering engine responsive to the fovea estimation engine. The rendering engine is configured to perform a comparison of a first result of an evaluation metric on part of the area of interest with a second result of the evaluation metric with another part of the area of interest. The rendering engine is further configured to render the graphics content using predictive adjustment to reduce latency based on the comparison.

In another illustrative example, a method of operation of a device includes generating an indication of an area of interest of graphics content at the device based on scene information related to the graphics content. The graphics content includes a first portion corresponding to the area of interest and further includes a second portion. The method further includes rendering the graphics content at the device based on comparing a first result of an evaluation metric on part of the area of interest with a second result of the evaluation metric with another part of the area of interest. The graphics content is rendered using predictive adjustment to reduce latency associated with foveating the area of interest.

In another illustrative example, an apparatus includes means for generating an indication of an area of interest of graphics content based on scene information related to the graphics content. The graphics content includes a first portion corresponding to the area of interest and further including a second portion. The apparatus further includes means for rendering the graphics content using predictive adjustment to reduce latency associated with foveating the area of interest based on comparing a first result of an evaluation metric on part of the area of interest with a second result of the evaluation metric with another part of the area of interest.

In another illustrative example, a computer-readable medium stores instructions executable by a processor to cause the processor to generate an indication of an area of interest of graphics content based on scene information related to the graphics content. The graphics content includes a first portion corresponding to the area of interest and further including a second portion. The instructions are further executable by the processor to render the graphics content using predictive adjustment to reduce latency associated with foveating the area of interest based on comparing a first result of an evaluation metric on part of the area of interest with a second result of the evaluation metric with another part of the area of interest.

IV. BRIEF DESCRIPTION OF THE DRAWINGS

V. DETAILED DESCRIPTION

A device in accordance with aspects of the disclosure includes a fovea estimation engine and a rendering engine. The fovea estimation engine is configured to identify an area of interest of graphics content based on scene information related to the graphics content. As a non-limiting illustrative example, the scene information may indicate a number of drawcalls associated with the area of interest, a number of triangles associated with the area of interest, a drawcall pattern associated with frames of the graphics content, one or more other parameters, or a combination thereof. The fovea estimation engine may predict the area of interest (e.g., before the area of interest is presented at a display) based on the scene information.

In an illustrative example, the scene information is determined during a binning phase associated with processing of the graphics content. For example, in some graphics processors, graphics content may be divided into a set of bins (or "tiles") that are processed separately. In an illustrative example, a binning engine is configured to determine the scene information during the binning phase, such as by determining a number of drawcalls or a number of triangles on a "per bin" basis. In another example, the scene information may be provided by a developer of the graphics content (e.g., by a software developer of an application corresponding to the graphics content).

By foveating graphics content based on scene information, use of a sensor to track eye position of a user may be reduced or avoided. As a result, performance may be improved, such as by avoiding latency associated with tracking of eye position. In addition, multiple areas of graphics content may be foveated concurrently, which may improve user experience in some cases.

Figure 1:
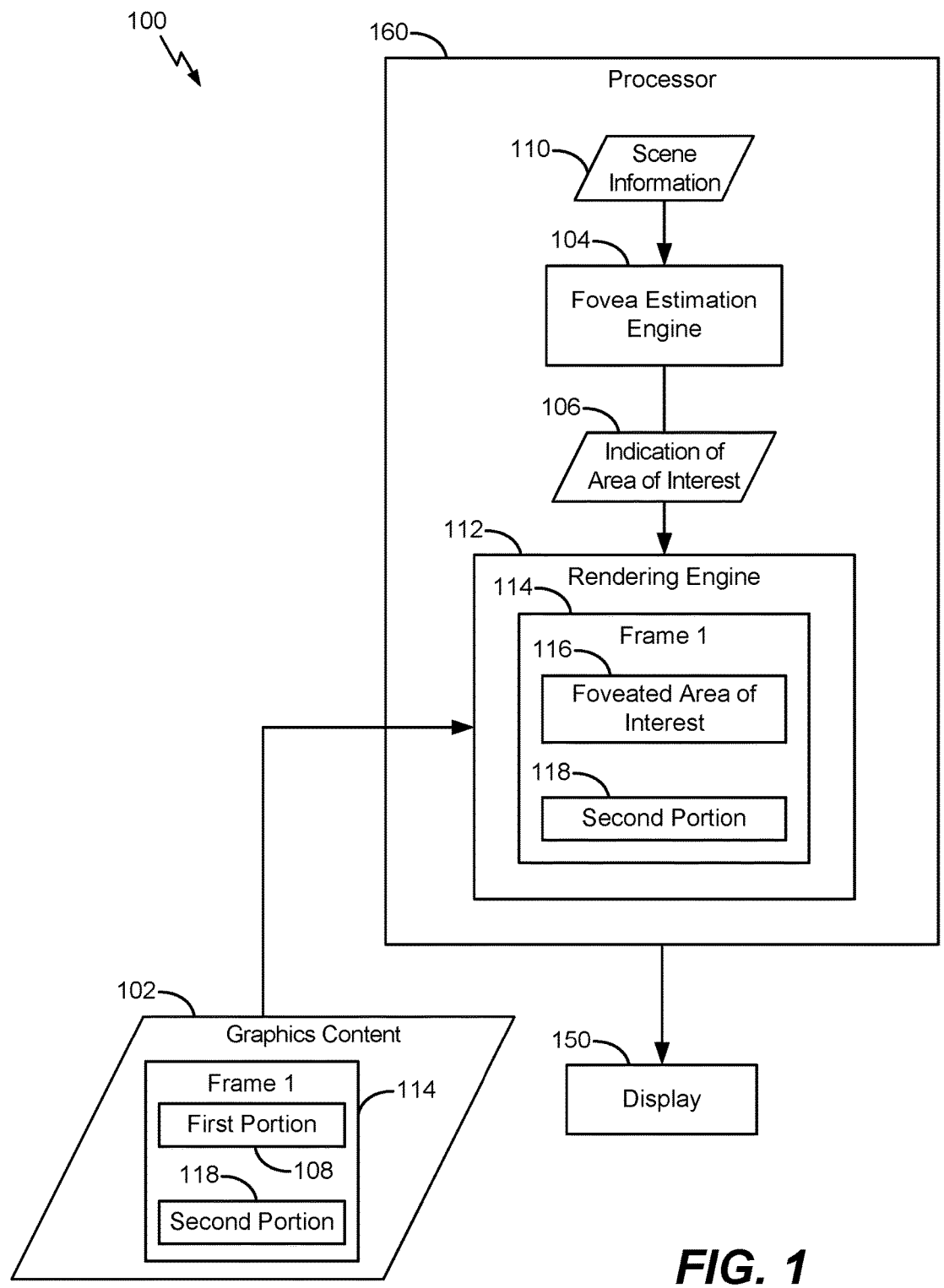
FIG. 1 is a diagram of an illustrative example of a device that includes a fovea estimation engine and a rendering engine.

FIG. 1 depicts an illustrative example of a device 100. The device 100 may be included in a graphics processing unit (GPU) that is configured to perform a graphics processing operation using graphics content 102, as an illustrative example. In some examples, the graphics content 102 may correspond to an augmented reality (AR) application or a virtual reality (VR) application.

The graphics content 102 includes one or more frames, such as a first frame 114. The first frame 114 may include a first portion 108 and a second portion 118.

The device 100 includes a fovea estimation engine 104. The device 100 further includes a rendering engine 112 that is responsive to the fovea estimation engine 104. For example, an input of the rendering engine 112 may be coupled to an output of the fovea estimation engine 104.

FIG. 1 also depicts that a display 150 may be coupled to or included in the device 100. To illustrate, the fovea estimation engine 104 and the rendering engine 112 may be included in a processor 160 (e.g., a GPU), and the processor 160 may be coupled to the display 150. The display 150 may be configured to present the graphics content 102.

During operation, the fovea estimation engine 104 is configured to generate an indication 106 of an area of interest (e.g., the first portion 108) of the graphics content 102. The fovea estimation engine 104 is configured to identify the first portion 108 based on scene information 110 related to the graphics content 102. In some examples, the first portion 108 corresponds to an area of interest of the graphics content 102, such as a frame portion that is likely to draw the gaze of a user. The first portion 108 may correspond to a character in a game or a colorful graphic, as illustrative examples.

The fovea estimation engine 104 may be configured to determine an evaluation metric associated with one or more parts of the graphics content 102. For example, the fovea estimation engine 104 may determine an evaluation metric (e.g., a ranking) on a per-bin basis, as described further with reference to FIG. 2. To further illustrate, as explained further with reference to FIG. 2, the evaluation metric may be based on one or more of a number of drawcalls in a bin that is part of the area of interest, a number of visible triangles associated with a bin that is part of the area of interest, a number of updated pixels associated with a bin that is part of the area of interest, or a number of arithmetic logic unit (ALU) instructions associated with a bin that is part of the area of interest. Alternatively or in addition, the fovea estimation engine 104 may determine an evaluation metric on a per-triangle basis, as described further with reference to FIG. 3.

In an illustrative example, the fovea estimation engine 104 is configured to compare a first result of an evaluation metric on part of an area of interest (e.g., the first portion 108) with a second result of the evaluation metric with another part of the area of interest. For example, the evaluation metric may be applied to "rank" bins or triangles of the area of interest, as described further with reference to FIGS. 2 and 3.

In some examples, the device 100 may receive the scene information 110 from a source of the graphics content 102, such as from a software developer of an application that includes the graphics content 102. To illustrate, the scene information 110 may include metadata that indicates the first portion 108. Alternatively or in addition, the device 100 may be configured to generate the scene information 110 based on the graphics content 102 (e.g., by analyzing the graphics content 102), as described further with reference to the examples of FIGS. 2-4.

The rendering engine 112 is configured to render the graphics content 102 by applying a foveated imaging technique to the first portion 108 based on the indication 106. For example, the rendering engine 112 may be configured to render the graphics content 102 by decreasing one or more of a fidelity of the second portion 118, an amount of detail of the second portion 118, or a resolution of the second portion 118. Alternatively or in addition, the rendering engine 112 may be configured to render the graphics content 102 by increasing one or more of a fidelity of the first portion 108, an amount of detail of the first portion 108, an image quality of the first portion 108, or a resolution of the first portion 108. The rendering engine 112 is configured to render the graphics content 102 by performing a comparison of a first result of an evaluation metric on part of the area of interest with a second result of the evaluation metric with another part of the area of interest, and the rendering engine 112 is configured to render the graphics content 102 to reduce latency based on the comparison. Illustrative examples of an evaluation metric are described further with reference to FIGS. 2 and 3.

Applying the foveated imaging technique to the first portion 108 (also referred to herein as foveating the first portion 108) may create a foveated area of interest 116 that replaces the first portion 108 in the first frame 114. The foveated area of interest 116 may include one or more of a first fidelity that is greater than a second fidelity of the second portion 118 of the first frame 114, a first amount of detail that is greater than a second amount of detail of the second portion 118, or a first resolution that is greater than a second resolution of the second portion 118.

The rendering engine 112 is configured to render the graphics content 102 using predictive adjustment to reduce latency associated with foveating an area of interest, such as the first portion 108. For example, by rendering the graphics content 102 based on the indication 106, the rendering engine 112 predictively adjusts (e.g., predictively foveates) the graphics content 102 (e.g., instead of "waiting" for eye tracking information from a sensor device, such as a camera, that indicates eye position of a user). As used herein, "predictive adjustment" may refer to foveating the area of interest based on graphics processing operations performed prior to presenting the area of interest at the display 150 (alternatively or in addition to foveating the area of interest based on eye tracking information). Predictively adjusting the graphics content 102 reduces latency as compared to "waiting" for eye tracking information (e.g., after presenting the graphics content 102 at a display).

By foveating the graphics content 102 based on the scene information 110, use of a sensor to track eye position of a user may be reduced or avoided. As a result, device performance may be improved, such as by avoiding latency associated with tracking eye position.

Figure 2:
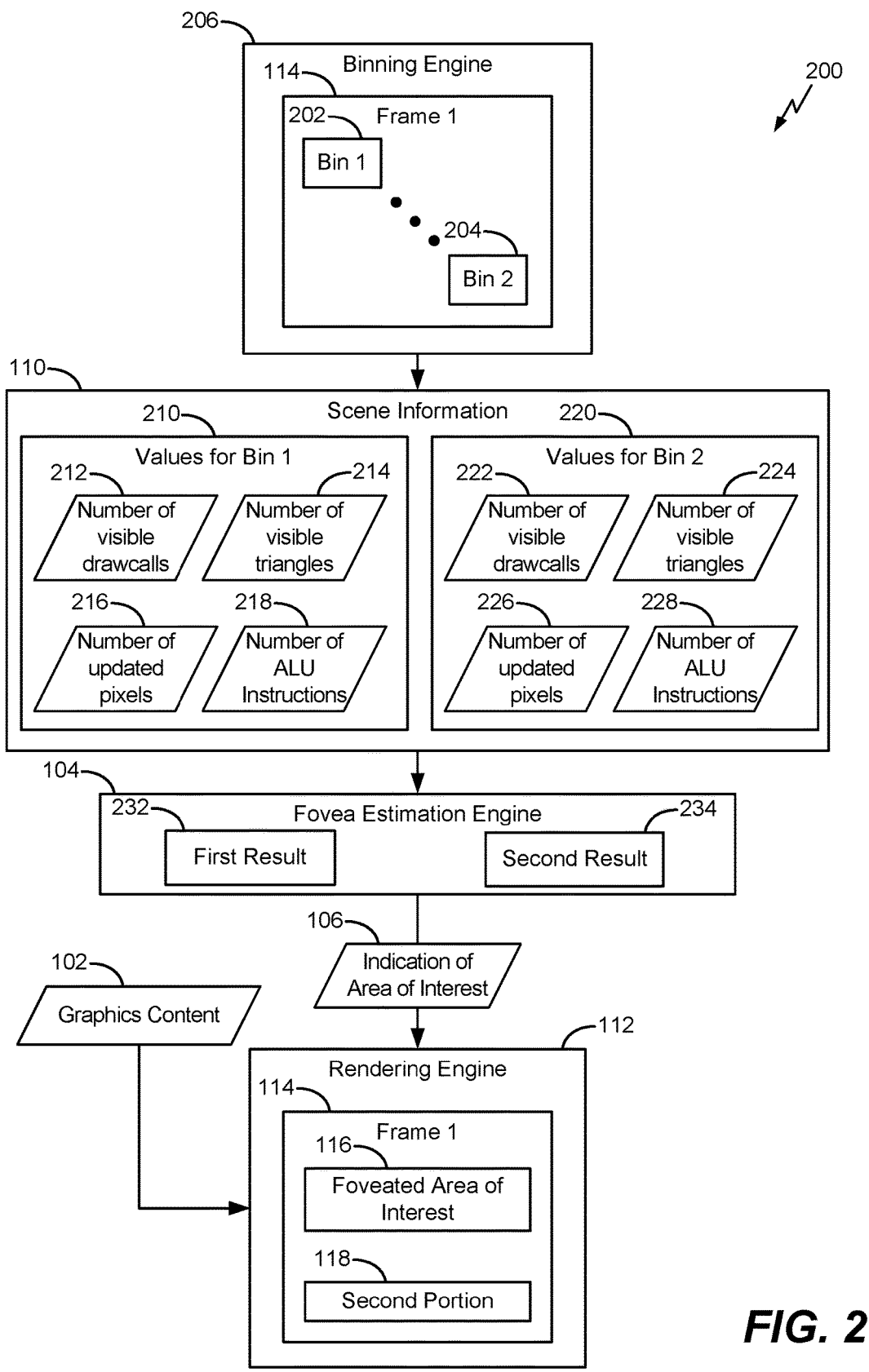
FIG. 2 is a diagram of a first illustrative example of the device of FIG. 1.

Referring to FIG. 2, an illustrative example of the device 100 of FIG. 1 is depicted and generally designated 200. In the example of FIG. 2, the device 200 includes a binning engine 206. The fovea estimation engine 104 is responsive to the binning engine 206. For example, an input of the fovea estimation engine 104 may be coupled to an output of the binning engine 206.

The binning engine 206 is configured to perform a binning process associated with processing of the graphics content 102. The binning process may include determining a set of bins associated with each frame of the graphics content 102. To illustrate, FIG. 2 depicts that the first frame 114 may be "divided" into a set of bins that includes a first bin 202 (e.g., a subset of pixels of the first frame 114) and a second bin 204 (e.g., another subset of pixels of the first frame 114). To further illustrate, a binning process performed by the binning engine 206 may include a vertex shading operation, a rasterization operation, one or more other operations, or a combination thereof.

The binning engine 206 is configured to determine the scene information 110 during the binning process. In the example of FIG. 2, the binning engine 206 is configured to determine a set of values for each bin associated with the first frame 114 (e.g., by determining a value of at least one parameter on a "per-bin" basis). To illustrate, the scene information 110 may indicate a first set of values 210 associated with the first bin 202 and may further indicate a second set of values 220 associated with the second bin 204.

In the illustrative example of FIG. 2, the first set of values 210 may indicate one or more of a number of visible drawcalls 212 associated with the first bin 202, a number of visible triangles 214 associated with the first bin 202, a number of updated pixels 216 associated with the first bin 202, or a number of arithmetic logic unit (ALU) instructions 218 associated with the first bin 202. The second set of values 220 may indicate one or more of a number of visible drawcalls 222 associated with the second bin 204, a number of visible triangles 224 associated with the second bin 204, a number of updated pixels 226 associated with the second bin 204, or a number of ALU instructions 228 associated with the second bin 204.

As used herein, a "drawcall" may refer to a set of primitives that correspond to an object or an effect. As used herein, a drawcall may be "visible" within a particular bin if a primitive of the drawcall specifies one or more pixels within the bin. In this case, the drawcall may be executed during rendering of the bin (e.g., during rendering by the rendering engine 112). Alternatively, if a drawcall is not associated with one or more primitives specifying one or more pixels within a particular bin, then the drawcall is not visible within the bin (and the drawcall is not executed during rendering of the bin). If a particular drawcall is not visible within a particular bin, the drawcall may be referred to as being "dead" with respect to the bin.

As used herein, a "triangle" may refer to a constituent shape used to represent an object or an effect. For example, a quadrilateral shape may be represented using two triangles. As used herein, a triangle may be "visible" within a particular bin if the triangle specifies one or more pixels within the bin. In this case, the triangle may be rendered during rendering of the bin (e.g., during rendering by the rendering engine 112). Alternatively, if a triangle is not associated with one or more pixels within a particular bin, then the triangle is not visible within the bin (and the triangle is not rendered during rendering of the bin). If a particular triangle is not visible within a particular bin, the triangle may be referred to as being "dead" with respect to the bin.

As used herein, an "update" or an "updated pixel" may refer to a pixel that is shaded (or that is to be shaded) during a rendering phase of a bin, such as during rendering by the rendering engine 112. In some cases, a number of updated pixels of a bin may correspond to a number of pixels of the bin. In other cases, a number of updated pixels of a bin may differ from a number of pixels of the bin (e.g., due to overlapping objects or overlapping primitives, as an illustrative example).

An ALU instruction may correspond to an arithmetic or logic operation that is executed with respect to a pixel during rendering of the pixel. In some cases, a more complex portion of a scene may be rendered using more ALU instructions as compared to a less complex portion of a scene.

The fovea estimation engine 104 may be configured to "rank" each bin associated with the first frame 114 based on the scene information 110. For example, the fovea estimation engine 104 may be configured to determine a first result 232 of an evaluation metric for the first bin 202 and a second result 234 of the evaluation metric for the second bin 204 based on the scene information 110. The fovea estimation engine 104 may identify the first portion 108 based on the results 232, 234. For example, if the first result 232 satisfies a threshold value (e.g., is greater than the threshold value), the fovea estimation engine 104 may select the first bin 202 for foveating by the rendering engine 112. In this example, the first bin 202 may correspond to the first portion 108.

It is noted that a particular technique for ranking bins of a frame may be selected based on the particular application and that a variety of techniques are within the scope of the disclosure. In a non-limiting illustrative example, an evaluation metric Rank_Bin for a particular bin B (e.g., the first bin 202, the second bin 204, or another bin) is determined based on Rank_Bin[B]=a*ALU_Inst[B]+b*Drawcalls_Visible[B]+c*Triangles_Visible[B]+d*Pixels_Updated[B]. In this example, a, b, c, and d may correspond to weighting coefficients that may be selected based on the particular application. Further, ALU_Inst[B] may indicate a number of ALU instructions (e.g., the number of ALU instructions 218 or the number of ALU instructions 228) associated with the bin B, and Drawcalls_Visible[B] may indicate a number of drawcalls (e.g., the number of visible drawcalls 212 or the number of visible drawcalls 222) visible within the bin B. In addition, Triangles_Visible [B] may indicate a number of triangles (e.g., the number of visible triangles 214 or the number of visible triangles 224) visible within the bin B, and Pixels_Updated[B] may refer to a number of pixels updated (e.g., the number of updated pixels 216 or the number of updated pixels 226) for the bin B.

In the example of FIG. 2, the scene information 110 is generated during a binning process performed by the binning engine 206, and the first portion 108 is foveated during a rendering process by the rendering engine 112 that occurs after the binning process. For example, the rendering engine 112 may increase resolution of the first portion 108 to generate the foveated area of interest 116.

The example of FIG. 2 illustrates aspects of a bin-based technique to generate the scene information 110. Alternatively or in addition, a triangle-based technique may be used to generate the scene information 110, as described further with reference to FIG. 3.

Figure 3:
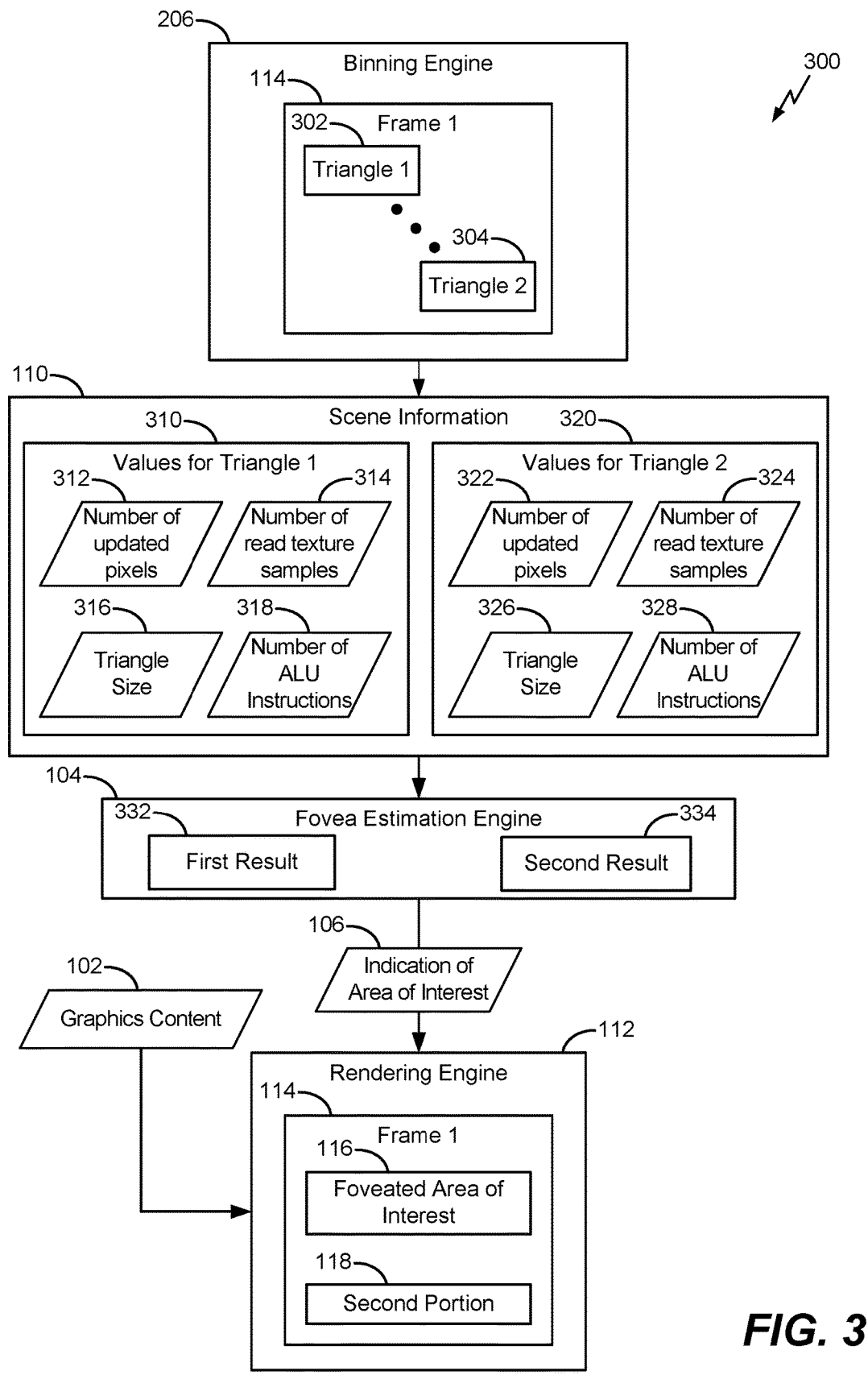
FIG. 3 is a diagram of a second illustrative example of the device of FIG. 1.

Referring to FIG. 3, another example of the device 100 of FIG. 1 is depicted and generally designated 300. In the example of FIG. 3, the device 300 is configured to perform certain operations on a "per-triangle" basis (e.g., alternatively or in addition to the "per-bin" basis described with reference to FIG. 2).

To illustrate, the first frame 114 may include a set of triangles, such as a first triangle 302 and a second triangle 304. The set of triangles may be used to represent objects in the first frame 114. As an illustrative example, a square-shaped object may be represented using two triangles. Other objects may be represented using a different number of triangles, a different configuration of triangles, or both.

In the example of FIG. 3, the binning engine 206 is configured to determine a set of values for each triangle associated with the first frame 114 (e.g., by determining a value of at least one parameter on a "per-triangle" basis). To illustrate, the scene information 110 may indicate a first set of values 310 associated with the first triangle 302 and may further indicate a second set of values 320 associated with the second triangle 304.

In the illustrative example of FIG. 3, the first set of values 310 may indicate one or more of a number of updated pixels 312 associated with the first triangle 302, a number of read texture samples 314 associated with the first triangle 302, a triangle size 316 of the first triangle 302, or a number of ALU instructions 318 associated with the first triangle 302. The second set of values 320 may indicate one or more of a number of updated pixels 322 associated with the second triangle 304, a number of read texture samples 324 associated with the second triangle 304, a triangle size 326 of the second triangle 304, or a number of ALU instructions 328 associated with the second triangle 304.

As used herein, a "texture sample read" for a particular bin may correspond to a particular ALU instruction that determines a value of a pixel by reading a texture value stored in memory. In this example, a pixel may map to a particular location on the texture. In some cases, a mapped location may not correspond to a pixel, and the texture value may be determined using an interpolation technique (also referred to as "filtering"). In some implementations, a texture sample read operation may be computationally "expensive" and may indicate complexity of a particular bin, which may correspond to a region of a scene that is likely to draw the gaze of a user. Accordingly, a relatively large number of texture sample read operations targeting a particular region (e.g., a foreground character) may indicate that the region is more likely to draw the gaze of a user as compared to another region (e.g., a background region) that is associated with fewer texture sample read operations.

The fovea estimation engine 104 may be configured to "rank" each triangle associated with the first frame 114 based on the scene information 110. For example, the fovea estimation engine 104 may be configured to determine a first result 332 of an evaluation metric for the first triangle 302 and a second result 334 of the evaluation metric for the second triangle 304 based on the scene information 110. The fovea estimation engine 104 may identify the first portion 108 based on the results 332, 334. For example, if the first result 232 satisfies a threshold value (e.g., is greater than the threshold value), the fovea estimation engine 104 may select the first triangle 302 to be foveated by the rendering engine 112. In this example, the first triangle 302 may correspond to the first portion 108.

It is noted that a particular technique for ranking triangles of a frame may be selected based on the particular application and that a variety of techniques are within the scope of the disclosure. In a non-limiting illustrative example, an evaluation metric Rank_Triangle for a particular triangle T (e.g., the first triangle 302, the second triangle 304, or another triangle) is determined based on Rank_Triangle[T]=v*ALU_Inst[T]+w*Triangle_Size[T]+x*Texture_Samples[T]+y*Pixels_Updated[T]. In this example, v, w, x, and y may correspond to weighting coefficients that may be selected based on the particular application. Further, ALU_Inst[T] may indicate a number of ALU instructions (e.g., the number of ALU instructions 318 or the number of ALU instructions 328) associated with the triangle T, and Triangle_Size[T] may indicate a triangle size (e.g., the triangle size 316 or the triangle size 326) of the triangle T. In addition, Texture_Samples[T] may indicate a number of texture samples (e.g., the number of read texture samples 314 or the number of read texture samples 324) read in connection with the triangle T, and Pixels_updated[T] may refer to a number of pixels (e.g., the number of updated pixels 312 or the number of updated pixels 322) updated in connection with the triangle T.

Although certain aspects of FIGS. 2 and 3 have been described separately for convenience, it should be appreciated that aspects of FIGS. 2 and 3 may be combined without departing from the scope of the disclosure. For example, a per-bin evaluation metric (e.g., Rank_Bin[B]) may be used in connection with a per-triangle evaluation metric (e.g., Rank_Triangle[T]), such as by determining an evaluation metric of a triangle based on an evaluation metric of a bin that includes the triangle. In an illustrative example, Rank_Triangle[T] may be determined based on Rank_Bin[B], where Rank_Triangle[T]=v*ALU_Inst[T]+w*Triangle_Size[T]+x*Texture_Samples[T]+y*Pixels_updated[T]+z*Rank_Bin[B], where z may correspond to a weighting coefficient that may be selected based on the particular application.

The example of FIG. 3 illustrates aspects of a triangle-based technique to generate the scene information 110. Alternatively or in addition, a drawcall pattern may be used to generate the scene information 110, as described further with reference to FIG. 4.

Figure 4:
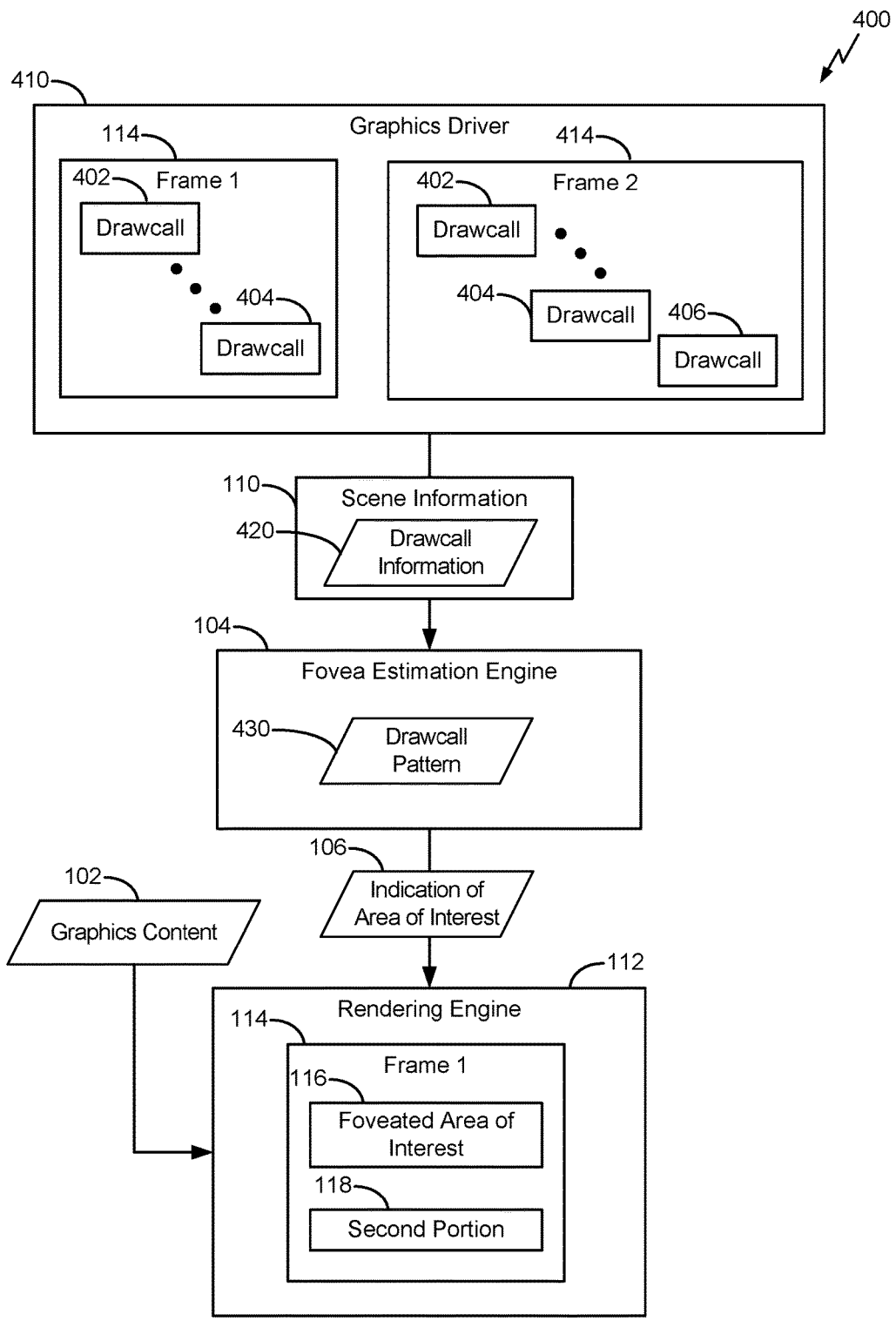
FIG. 4 is a diagram of a third illustrative example of the device of FIG. 1.

Referring to FIG. 4, another example of the device 100 of FIG. 1 is depicted and generally designated 400. In the example of FIG. 4, the graphics content 102 may include the first frame 114 and a second frame 414 (e.g., consecutive frames of the graphics content 102). The first frame 114 may include a set of drawcalls, such as a first drawcall 402 and a second drawcall 404. The second frame 414 may include the first drawcall 402, the second drawcall 404, and a third drawcall 406.

The scene information 110 may include drawcall information 420. For example, the drawcall information 420 may identify that the first frame 114 includes the drawcalls 402, 404 and that the second frame 414 includes the drawcalls 402, 404, and 406. In some examples, the drawcall information 420 may be generated by a graphics driver 410. For example, the graphics driver 410 may determine (e.g., "capture") the drawcall information 420 during processing of the graphics content 102 by the graphics driver 410, such as based on application program interface (API) calls received during processing of the graphics content 102, as described further with reference to FIG. 5.

The fovea estimation engine 104 may be configured to determine a drawcall pattern 430 based on the drawcall information 420. For example, the fovea estimation engine 104 may be configured to determine based on the drawcall information 420 that the drawcalls 402, 404 are included in both the frames 114, 414 and that the third drawcall 406 is not included in the first frame 114. The fovea estimation engine 104 may determine that the third drawcall 406 is likely to correspond to a "high interest" region of the graphics content 102, such as a scene change in the graphics content 102. In this example, the third drawcall 406 may correspond to the first portion 108.

Figure 5:
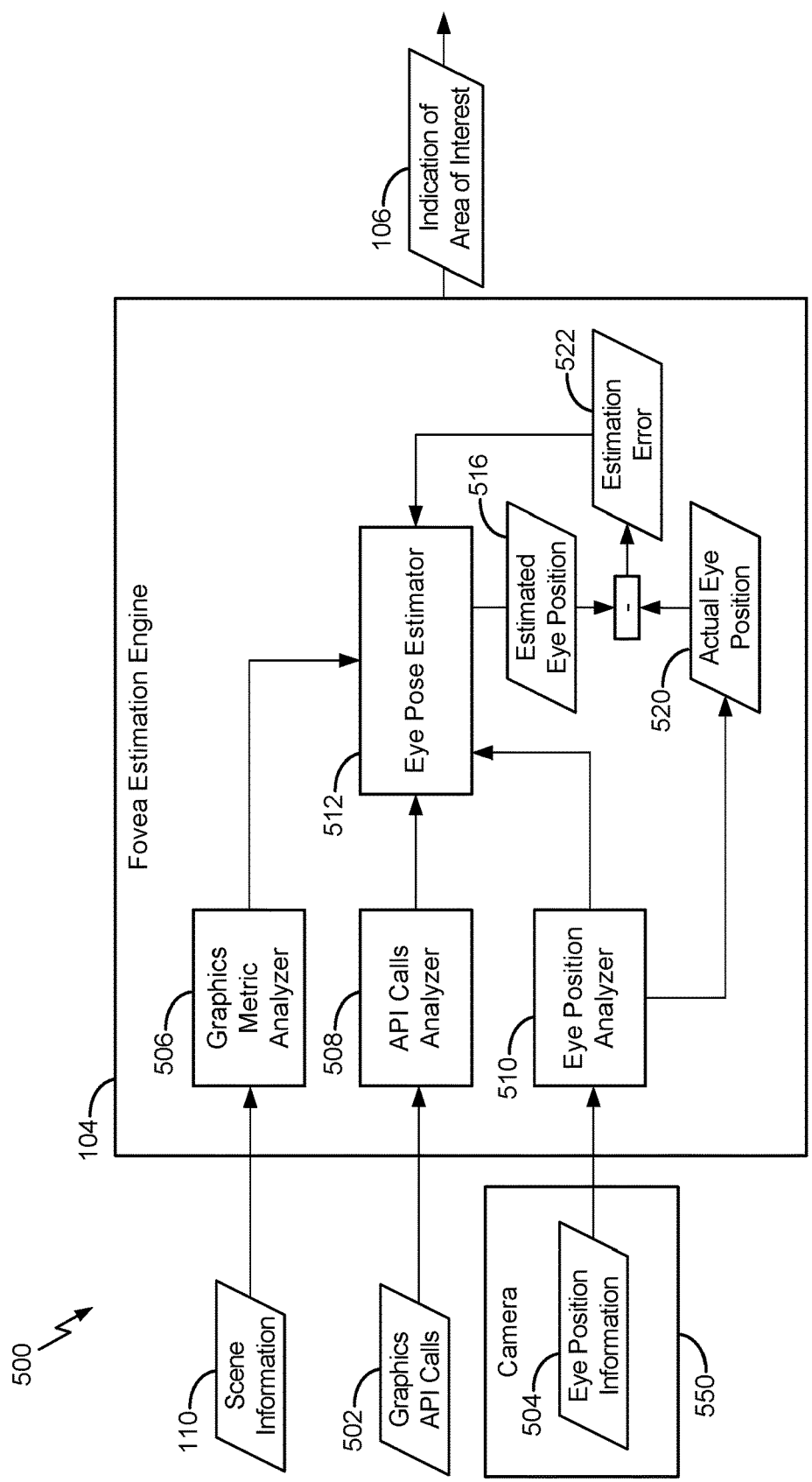
FIG. 5 is a diagram of an illustrative example of a system that includes the fovea estimation engine of FIG. 1.

FIG. 5 illustrates a particular illustrative example of a system 500 that includes the fovea estimation engine 104 and a camera 550. In the example of FIG. 5, the fovea estimation engine 104 includes a graphics metric analyzer 506, an application program interface (API) calls analyzer 508, and an eye position analyzer 510. The fovea estimation engine 104 may further include an eye pose estimator 512 coupled to the graphics metric analyzer 506, to the API calls analyzer 508, and to the eye position analyzer 510.

During operation, the fovea estimation engine 104 may be configured to receive the scene information 110, graphics API calls 502, and eye position information 504. The graphics metric analyzer 506 may be configured to operate in accordance with one or more aspects of FIG. 2, one or more aspects of FIG. 3, or a combination thereof. For example, the graphics metric analyzer 506 may be configured to determine Rank_Bin[B] as described with reference to FIG. 2, Rank_Triangle[T] as described with reference to FIG. 3, or both.

The API calls analyzer 508 may be configured to operate in accordance with one or more aspects of FIG. 4. For example, the API calls analyzer 508 may determine the drawcall information 420 of FIG. 4 based on the graphics API calls 502. For example, a large number of API calls 502 targeting a particular region of a frame may indicate a large amount of detail of the particular region, which may be likely to draw the gaze of a user. The API calls 502 may indicate rendering operations to be performed by the rendering engine 112 of FIG. 1, as an illustrative example. The API calls analyzer 508 may be configured to "intercept" the API calls 502 prior to receipt of the API calls 502 by the rendering engine 112, as an illustrative example.

In an illustrative example, the eye position analyzer 510 may be configured to receive the eye position information 504 from the camera 550 (e.g., a sensor device) that tracks eye position of a user. For example, in some applications, a headset may be worn by a user, and the headset may include the camera 550. The eye position analyzer 510 may be configured to determine an actual eye position 520 based on the eye position information 504.

The eye pose estimator 512 may be configured to determine an estimated eye position 516 of the user. For example, the eye pose estimator 512 may be configured to determine the estimated eye position 516 based on information provided by one or more of the graphics metric analyzer 506, the API calls analyzer 508, or the eye position analyzer 510. The first portion 108 may be identified using (or may correspond to) the estimated eye position 516. In some implementations, the indication 106 may identify the estimated eye position 516.

The fovea estimation engine 104 may be configured to determine an estimation error 522 (e.g., a difference between the estimated eye position 516 and the actual eye position 520). The fovea estimation engine 104 may be configured to use the estimation error 522 in connection with one or more subsequent operations. For example, the fovea estimation engine 104 may be configured to use the estimation error 522 to "predict" subsequent eye positions of a user.

Figure 6:
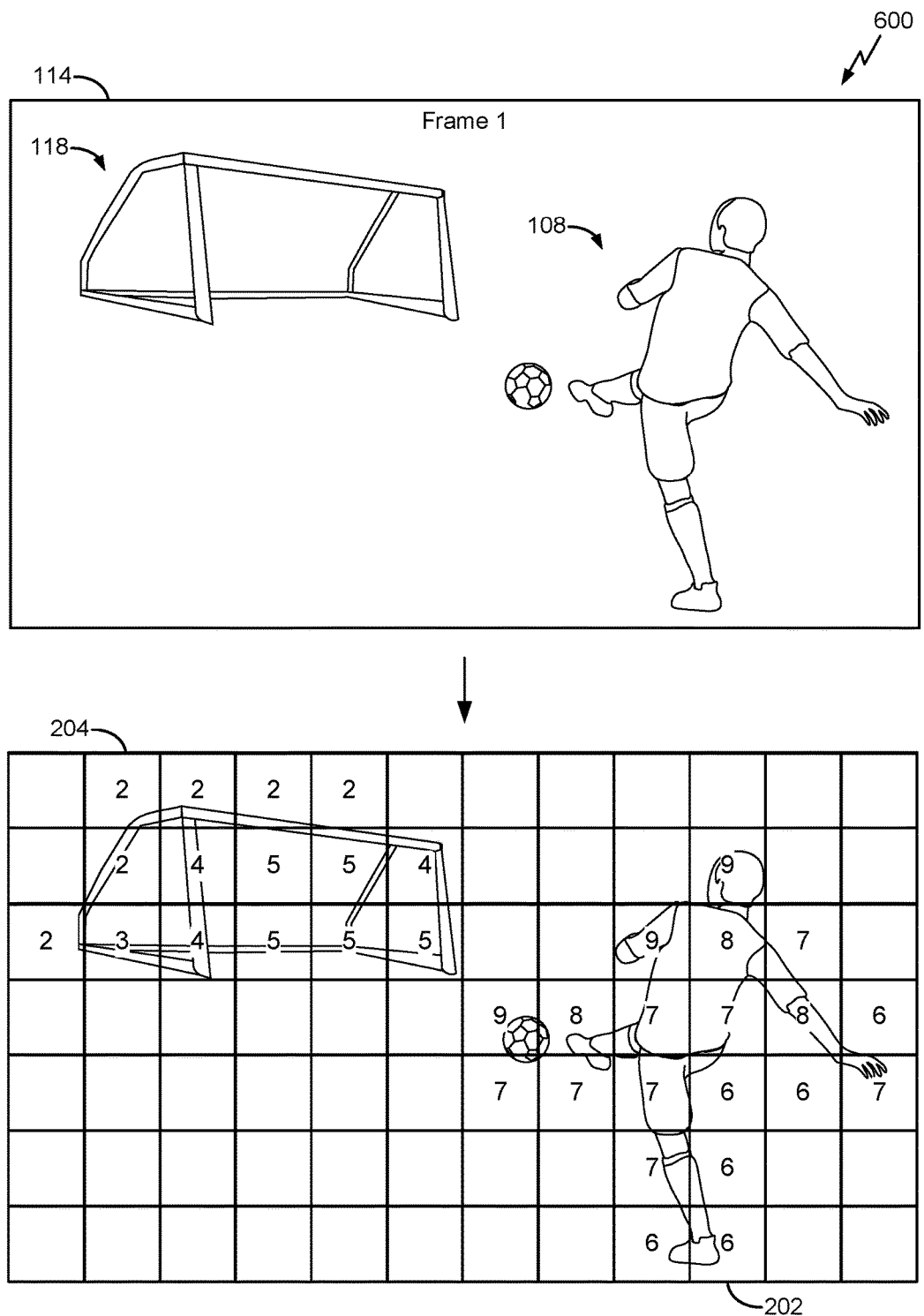
FIG. 6 is a diagram of an illustrative example of a binning and ranking process that may be performed by the device of FIG. 1.

FIG. 6 illustrates an example of a binning and ranking process 600. The binning and ranking process 600 may be performed at the device 200 of FIG. 2, as an illustrative example.

The binning and ranking process 600 of FIG. 6 may be applied to the first frame 114 to create a set of bins, such as the first bin 202 and the second bin 204. For example, the binning engine 206 of FIG. 2 may "divide" (or "partition") the first frame 114 into a plurality of square tiles, as an illustrative example.

In the example of FIG. 6, the first portion 108 may include a representation of a soccer player. The second portion 118 may include a representation of a background region, such as a soccer goal. The first frame 114 may correspond to a frame of a soccer game application, as an illustrative example.

The scene information 110 of FIGS. 1-5 may include information related to bins associated with the first frame 114, such as information related to the bins 202, 204. For example, the scene information 110 may include the values 210, 220 of FIG. 2.

The fovea estimation engine 104 may be configured to rank bins associated with the first frame 114 based on the scene information 110 of FIGS. 1-5. In the illustrative example of FIG. 6, a ranking may correspond to a value selected from the integers 1, 2, . . . 10. To illustrate, the fovea estimation engine 104 may be configured to assign a ranking of 6 to the first bin 202 and a ranking 2 to the second bin 204. In this example, a ranking of 6 may indicate that a frame portion within the first bin 202 is more likely to draw the gaze of a user than a frame portion within the second bin 204.

Although the binning and ranking process 600 of FIG. 6 is described with reference to two portions 108, 118, it should be appreciated that the binning and ranking process 600 may be performed using a different number of areas of the graphics content 102 (e.g., using three or more areas). Further, different areas may be rendered using different amounts of foveating. For example, a "spectrum" of foveating may be applied to the graphics content 102 so that differently ranked areas are foveated based on different amounts. In some cases, the binning and ranking process 600 may enable foveating of multiple areas of interest. For example, although user gaze may be focused on the soccer ball illustrated in FIG. 6, in some cases both the soccer ball and the soccer player of FIG. 6 may be foveated.

Alternatively or in addition to the binning and ranking process 600 of FIG. 6, the fovea estimation engine 104 may be configured to rank portions of a frame (e.g., the first frame 114) using a triangle-based technique. For example, the fovea estimation engine 104 may be configured to rank triangles of the first frame 114. Alternatively or in addition, the fovea estimation engine 104 may be configured to use a drawcall pattern to identify an area of interest, as described further with reference to FIG. 7.

Figure 7:
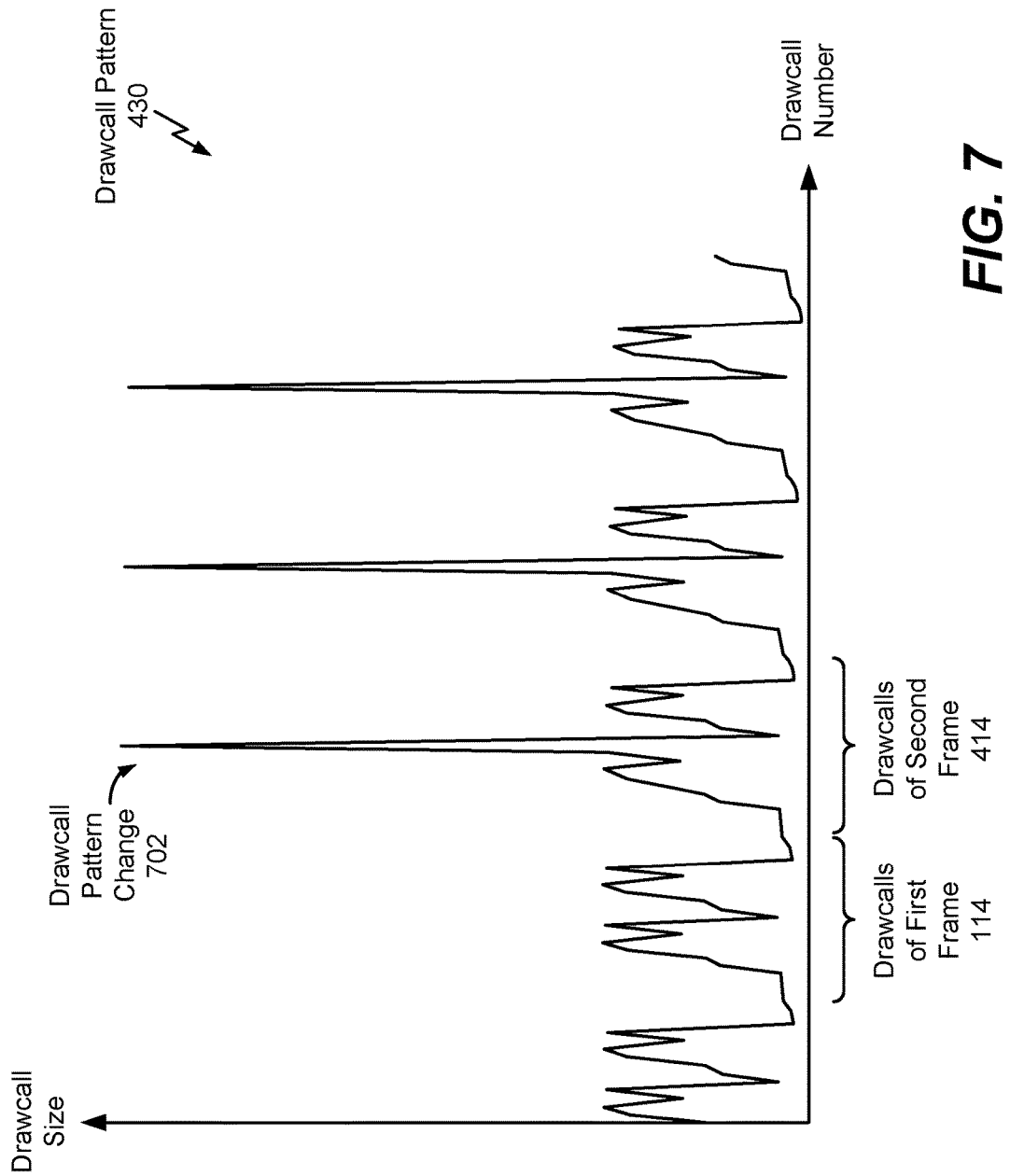
FIG. 7 is a diagram of an illustrative example of a drawcall pattern that may be used by the fovea estimation engine of FIG. 1.

FIG. 7 depicts an illustrative example of the drawcall pattern 430. In FIG. 7, the drawcall pattern 430 is represented using a graph having an abscissa indicating a drawcall number (e.g., an index value used to identify a drawcall) and an ordinate indicating a drawcall size (e.g., a number of triangles used in connection with the drawcall). Information of the drawcall pattern 430 of FIG. 7 may be indicated by the drawcall information 420 of FIG. 4.

In some examples, the drawcall pattern 430 may be based on drawcalls of multiple frames (e.g., a set of consecutive frames) of the graphics content 102. To illustrate, FIG. 7 depicts that the drawcall pattern 430 may be based on drawcalls of the first frame 114 and based on drawcalls of the second frame 414. In an illustrative example, the drawcalls of the first frame 114 include the drawcalls 402, 404 of FIG. 4, and the drawcalls of the second frame 414 include the drawcalls 402, 404, and 406.

The drawcall pattern 430 includes a drawcall pattern change 702 associated with one or more drawcalls of the second frame 414. To illustrate, the third drawcall 406 may be associated with the drawcall pattern change 702. The drawcall pattern change 702 may correspond to a scene change (e.g., movement of the first portion 108). For example, if the soccer ball illustrated in FIG. 6 is kicked, the third drawcall 406 may be used to depict movement of the soccer ball. Other drawcalls of the drawcall pattern 430 (e.g., the drawcalls 402, 404) may remain "fixed" between the frames 114, 414. For example, drawcalls used to render the goal depicted in FIG. 6 may remain "fixed" between the frames 114, 414.

The example of FIG. 7 illustrates that the drawcall pattern 430 may include the drawcall pattern change 702, which may indicate a "new" feature in a frame, such as a scene change. The drawcall pattern change 702 may be used to detect a region to be foveated, such as to detect the first portion 108 of FIG. 1, as an illustrative example.

Figure 8:
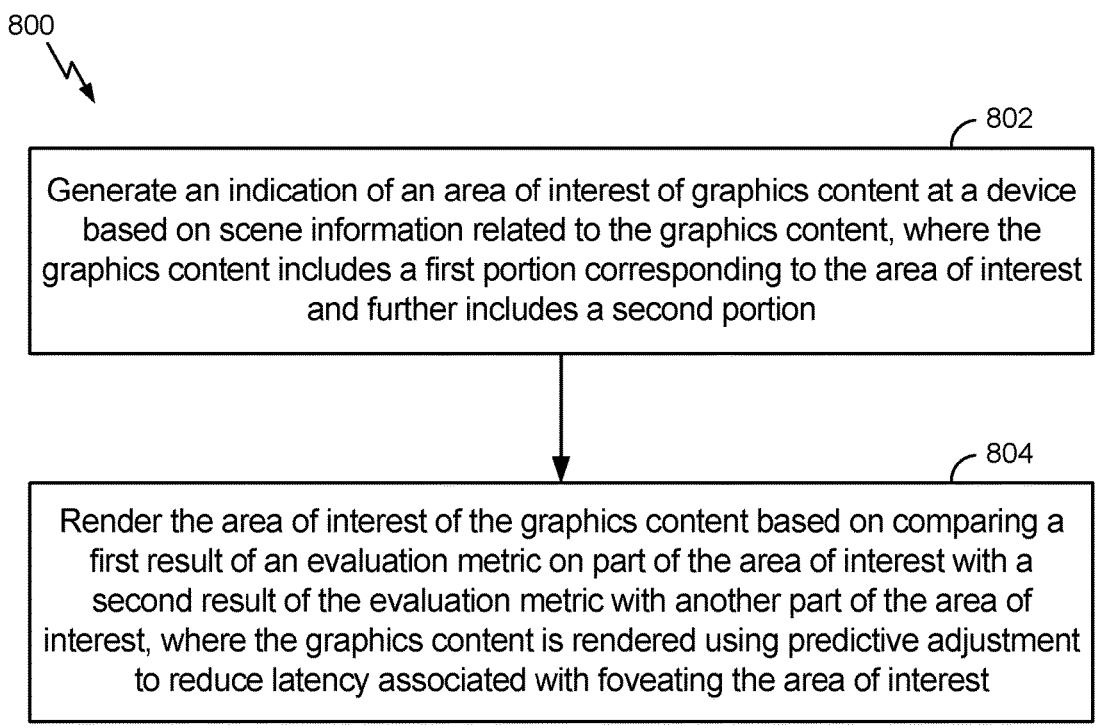
FIG. 8 is a diagram of an illustrative method of operation of the device of FIG. 1.

FIG. 8 depicts an illustrative example of a method 800 of operation of a device. The method 800 may be performed by the device 100 of FIG. 1, by the device 200 of FIG. 2, by the device 300 of FIG. 3, by the device 400 of FIG. 4, using the fovea estimation engine 104 of FIG. 5, using another device, or any combination thereof.

The method 800 includes generating an indication of an area of interest of graphics content at the device based on scene information related to the graphics content, at 802. The graphics content includes a first portion corresponding to the area of interest and further includes a second portion. For example, the fovea estimation engine 104 may receive the graphics content 102, and the graphics content may include the first portion 108 and the second portion 118.

The method 800 further includes rendering the area of interest of the graphics content based on comparing a first result of an evaluation metric on part of the area of interest with a second result of the evaluation metric with another part of the area of interest, at 804. The graphics content is rendered using predictive adjustment to reduce latency associated with foveating the area of interest. To illustrate, the first portion 108 may be rendered using a foveated imaging technique based on the scene information 110 to generate the foveated area of interest 116. In an illustrative example, the first result of the evaluation metric corresponds to the first result 232 or the first result 332, and the second result of the evaluation metric corresponds to the second result 234 or the second result 334.

In some implementations, the scene information 110 is received from a developer of the graphics content 102. For example, the scene information 110 may include metadata received from a developer of the graphics content 102. Alternatively, the scene information 110 may be generated (e.g., on-the-fly) based on the graphics content 102 during graphics processing of the graphics content 102.

In a first example, the method 800 may include associating regions of a frame of the graphics content 102 with a plurality of bins and determining the evaluation metric by ranking the plurality of bins. To illustrate, the example of FIG. 6 depicts that the first frame 114 may be associated with a plurality of bins, and each bin may be ranked to determine values of the evaluation metric for the plurality of bins. The evaluation metric correspond to a number of visible drawcalls (e.g., the number of visible drawcalls 212) per bin, a number of visible triangles (e.g., the number of visible triangles 214) per bin, a number of pixels updated (e.g., the number of updated pixels 216) per bin, a number of ALU instructions (e.g., the number of ALU instructions 218) per bin, one or more other parameters, or a combination thereof. The area of interest may be identified based on the evaluation metric (e.g., based on a comparison of values of the evaluation metric for the plurality of bins).

Alternatively or in addition to the first example, in a second example, the method 800 may include associating regions of a frame of the graphics content 102 with a plurality of triangles and determining the evaluation metric by ranking the plurality of triangles. To illustrate, the first frame 114 may be rendered using a plurality of triangles, and each triangle may be ranked to determine values of the evaluation metric for the plurality of triangles. The evaluation metric may correspond to a number of pixels (e.g., the number of updated pixels 312) updated per triangle, a number of texture samples (e.g., the number of read texture samples 314) read per triangle, a triangle size (e.g., the triangle size 316) per triangle, a number of ALU instructions (e.g., the number of ALU instructions 318) per triangle, one or more other parameters, or a combination thereof. The first portion 108 may be identified based on the evaluation metric (e.g., based on a comparison of values of the evaluation metric for the plurality of triangles).

Alternatively or in addition to the first example and the second example, the method 800 may include identifying a first set of drawcalls (e.g., the drawcalls 402, 404) of a first frame (e.g., the first frame 114) of the graphics content 102 and may further include identifying a second set of drawcalls (e.g., the drawcalls 402, 404, and 406) of a second frame (e.g., the second frame 414) of the graphics content 102. In this example, the second set of drawcalls includes at least one drawcall (e.g., the third drawcall 406) that is not included in the first set of drawcalls. The first portion 108 may be identified in the second frame 414 based on the at least one drawcall.

In some implementations, the first portion 108 may be identified using eye position information, such as the eye position information 504. The method 800 may include receiving the eye position information 504 (e.g., from the camera 550 of FIG. 5) and identifying the first portion 108 further based on the eye position information 504.

In an illustrative example, the indication is generated by a processor of the device, such as by the processor 160 of the device 100 of FIG. 1. The graphics content may be rendered by the processor. The method 800 may further include providing the graphics content to a display, such as to the display 150 of FIG. 1.

Figure 9:
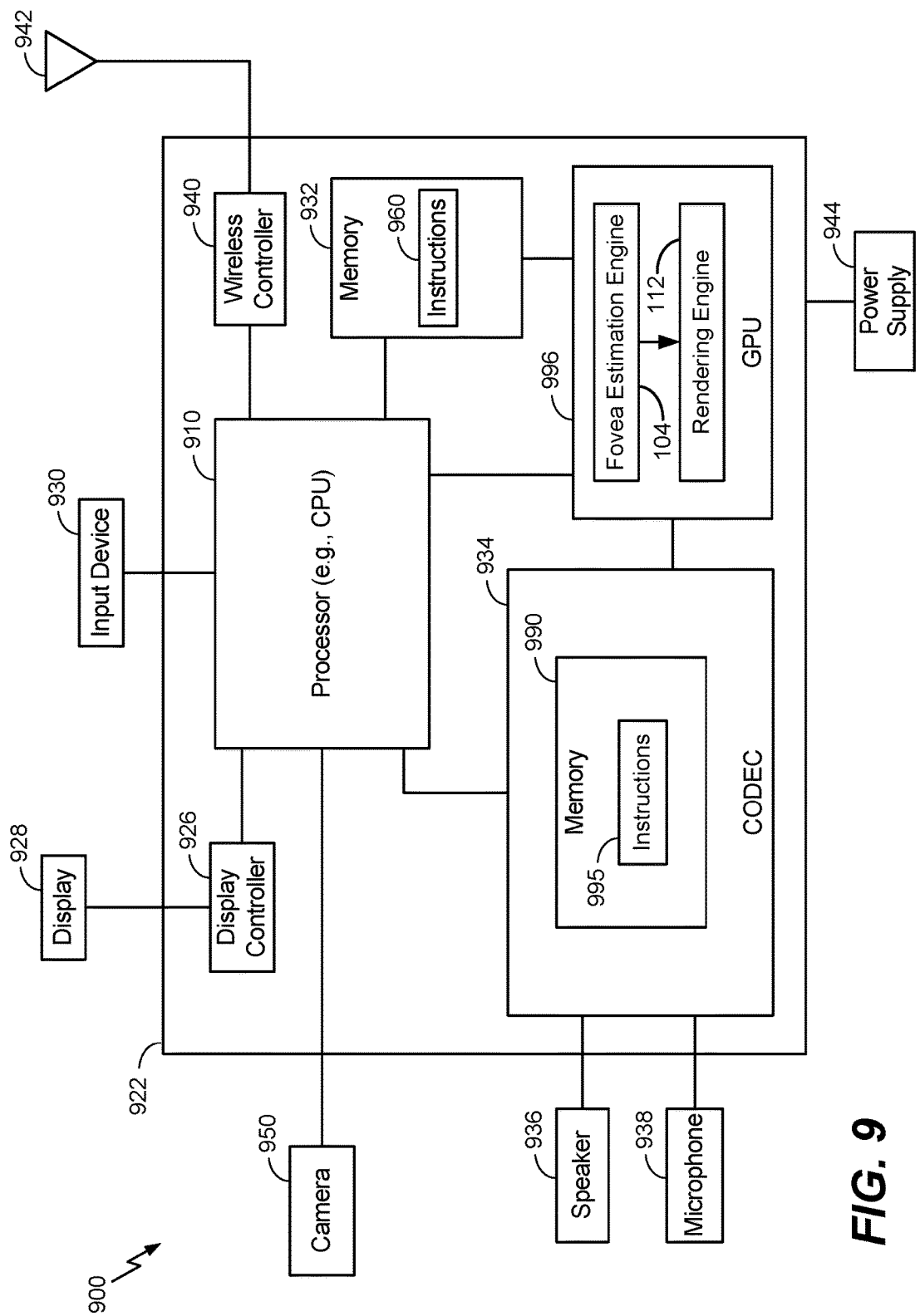
FIG. 9 is a block diagram of an illustrative example of an electronic device that includes the device of FIG. 1.

Referring to FIG. 9, a block diagram of a particular illustrative example of an electronic device is depicted and generally designated 900. The electronic device 900 may correspond to a mobile device (e.g., a cellular phone), a computer (e.g., a server, a laptop computer, a tablet computer, or a desktop computer), an access point, a base station, a wearable electronic device (e.g., a personal camera, a head-mounted display, or a watch), a vehicle control system or console, an autonomous vehicle (e.g., a robotic car or a drone), a home appliance, a set top box, an entertainment device, a navigation device, a personal digital assistant (PDA), a television, a monitor, a tuner, a radio (e.g., a satellite radio), a music player (e.g., a digital music player or a portable music player), a video player (e.g., a digital video player, such as a digital video disc (DVD) player or a portable digital video player), a robot, a healthcare device, another electronic device, or a combination thereof.

The electronic device 900 includes one or more processors, such as a processor 910 and a graphics processing unit (GPU) 996. The processor 910 may include a central processing unit (CPU), a digital signal processor (DSP), another processing device, or a combination thereof. In the example of FIG. 9, the GPU 996 includes the fovea estimation engine 104 and the rendering engine 112. Depending on the particular implementation, the GPU 996 may include the device 100 of FIG. 1, the device 200 of FIG. 2, the device 300 of FIG. 3, the device 400 of FIG. 4, one or more other devices, or a combination thereof. The GPU 996 may correspond to the processor 160 of FIG. 1.

The processor 910 may be coupled to the GPU 996. In an illustrative example, the processor 910 may be configured to communicate with the GPU 996 using the graphics API calls 502 of FIG. 5. For example, the GPU 996 may include the API calls analyzer 508 of FIG. 5, and the processor 910 may be configured to provide the API calls 502 of FIG. 5 to the API calls analyzer 508 during graphics processing performed by the GPU 996.

The electronic device 900 may further include one or more memories, such as a memory 932. The memory 932 may be coupled to the processor 910, to the GPU 996, or to both. The memory 932 may include random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), one or more registers, a hard disk, a removable disk, a compact disc read-only memory (CD-ROM), another memory device, or a combination thereof.

The memory 932 may store instructions 960. The instructions 960 may be executable by the processor 910, by the GPU 996, or by both.

A coder/decoder (CODEC) 934 can also be coupled to the processor 910. The CODEC 934 may be coupled to one or more microphones, such as a microphone 938. The CODEC 934 may include a memory 990 storing instructions 995 executable by the CODEC 934.

FIG. 9 also shows a display controller 926 that is coupled to the processor 910 and to a display 928 (e.g., the display 150 of FIG. 1). A speaker 936 may be coupled to the CODEC 934. The electronic device 900 may further include a wireless controller 940 coupled to an antenna 942.

The electronic device 900 may further include a camera 950 (e.g., the camera 550 of FIG. 5). The camera 950 may be configured to generate the eye position information 504 of FIG. 5, such as by capturing one or more images of a user that indicate the eye position information 504. The fovea estimation engine 104 may be configured to identify an area of interest based on the eye position information 504, as described with reference to FIG. 5.

In a particular example, the processor 910, the GPU 996, the memory 932, the display controller 926, the CODEC 934, and the wireless controller 940 are included in a system-on-chip (SoC) device 922. Further, an input device 930 and a power supply 944 may be coupled to the SoC device 922. Moreover, in a particular example, as illustrated in FIG. 9, the display 928, the input device 930, the speaker 936, the microphone 938, the antenna 942, the power supply 944, and the camera 950 are external to the SoC device 922. However, each of the display 928, the input device 930, the speaker 936, the microphone 938, the antenna 942, the power supply 944, and the camera 950 can be coupled to a component of the SoC device 922, such as to an interface or to a controller.

In conjunction with the described embodiments, an apparatus includes means (e.g., the fovea estimation engine 104) for generating an indication of an area of interest (e.g., the indication 106 of the first portion 108) of graphics content (e.g., the graphics content 102) based on scene information (e.g., the scene information 110) related to the graphics content. The graphics content includes a first portion corresponding to the area of interest and further including a second portion. For example, the graphics content 102 includes the first portion 108 and the second portion 118. The apparatus further includes means (e.g., the rendering engine 112) for rendering the graphics content using predictive adjustment to reduce latency associated with foveating the area of interest based on comparing a first result of an evaluation metric on part of the area of interest with a second result of an evaluation metric with another part of the area of interest. In an illustrative example, the apparatus further includes means (e.g., the binning engine 206) for performing a binning process (e.g., in connection with the binning and ranking process 600) associated with processing of the graphics content and for determining the scene information during the binning process.

In conjunction with the described embodiments, a computer-readable medium (e.g., the memory 932) stores instructions (e.g., the instructions 960) executable by a processor (e.g., the processor 160, the GPU 996, or both) to cause the processor to generate an indication of an area of interest (e.g., the indication 106 of the first portion 108) of graphics content (e.g., the graphics content 102) based on scene information (e.g., the scene information 110) related to the graphics content. The graphics content includes a first portion corresponding to the area of interest and further including a second portion. For example, the graphics content 102 includes the first portion 108 and the second portion 118. The instructions are further executable by the processor to render the graphics content using predictive adjustment to reduce latency associated with foveating the area of interest based on comparing a first result of an evaluation metric on part of the area of interest with a second result of an evaluation metric with another part of the area of interest (e.g., to generate the foveated area of interest 116). In an illustrative example, the instructions are further executable by the processor to determine the scene information during a binning process (e.g., during the binning and ranking process 600) associated with processing of the graphics content.

As used herein, "coupled" may include communicatively coupled, electrically coupled, magnetically coupled, physically coupled, optically coupled, and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc.

As used herein, an "engine" (e.g., one or more of the binning engine 206, the fovea estimation engine 104, or the rendering engine 112) may include hardware, processor-executable instructions stored in a computer-readable medium, or a combination thereof. To illustrate, the fovea estimation engine 104 may include a first circuit configured to determine results of an evaluation metric, such as one or more of the evaluation metrics Rank_Bin[B] and Rank_Triangle[T] described with reference to FIGS. 2 and 3. The first circuit may include one or more multiplier circuits, one or more adder circuits, one or more other circuits, or a combination thereof. In an illustrative example, the first circuit includes a set of multiplier circuits and a set of adder circuits configured to determine one or more of Rank_Bin[B]=a*ALU_Inst[B]+b*Drawcalls_Visible[B]+c*Triangles_Visible[B]+d*Pixels_Updated[B], Rank_Triangle[T]=v*ALU_Inst[T]+w*Triangle_Size[T]+x*Texture_Samples[T], or Rank_Triangle[T]=v*ALU_Inst[T]+w*Triangle_Size[T]+x*Texture_Samples[T]+y*Pixels_Updated[T]. The fovea estimation engine 104 may further include a comparator circuit having an input coupled to an output of the first circuit. The comparator circuit may be configured to compare results of the evaluation metric (e.g., any of the results 232, 234, 332, and 334) to determine the indication 106. Alternatively or in addition, one or more operations of the fovea estimation engine 104 may be implemented using a processor configured to execute instructions retrieved from a computer-readable medium.

The foregoing disclosed devices and functionalities may be designed and represented using computer files (e.g. RTL, GDSII, GERBER, etc.). The computer files may be stored on computer-readable media. Some or all such files may be provided to fabrication handlers who fabricate devices based on such files. Resulting products include wafers that are then cut into die and packaged into integrated circuits (or "chips"). The integrated circuits are then employed in electronic devices, such as the electronic device 900 of FIG. 9.

Although certain examples have been described separately for convenience, it is noted that aspects of such examples may be suitably combined without departing from the scope of the disclosure. For example, the device 100 may be configured to operate based on aspects described with reference to each of FIGS. 2, 3, and 4. Those of skill in the art will recognize other such modifications that are within the scope of the disclosure.

The various illustrative logical blocks, configurations, modules, circuits, and algorithm steps described in connection with the examples disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

One or more operations of a method or algorithm described herein may be embodied directly in hardware, in a software module executed by a processor, or in a combination of the two. For example, one or more operations of the method 800 of FIG. 8 may be initiated, controlled, or performed by a field-programmable gate array (FPGA) device, an application-specific integrated circuit (ASIC), a processing unit such as a central processing unit (CPU), a digital signal processor (DSP), a controller, another hardware device, a firmware device, or a combination thereof. A software module may reside in random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed examples is provided to enable a person skilled in the art to make or use the disclosed examples. Various modifications to these examples will readily apparent to those skilled in the art, and the principles defined herein may be applied to other examples without departing from the scope of the disclosure. Thus, the present disclosure is not intended to be limited to the examples shown herein but is to be accorded the widest scope possible consistent with the principles and novel features as defined by the following claims.

What is claimed is:

1. An apparatus configured to render graphics content, the apparatus comprising:
   a fovea estimation engine configured to generate an indication of a first portion of graphics content based on scene information related to the graphics content, the graphics content further including a second portion; and
   a rendering engine responsive to the fovea estimation engine, the rendering engine configured to perform a comparison of a first value of an evaluation metric associated with the graphics content with a second value of the evaluation metric, the first value associated with the first portion and the second value associated with the second portion, wherein the evaluation metric is based on at least one of a number of visible triangles associated with a bin of the graphics content, a number of pixels updated per triangle of the graphics content, a number of texture samples read per triangle of the graphics content, or a number of arithmetic logic unit (ALU) instructions associated per triangle or bin of the graphics content, wherein the rendering engine is further configured to render the graphics content using predictive adjustment based on the comparison.

2. The apparatus of claim 1, further comprising a processor, the processor including the fovea estimation engine and the rendering engine.

3. The apparatus of claim 1, further comprising a camera configured to generate eye position information, wherein the fovea estimation engine is further configured to identify the first portion further based on the eye position information.

4. The apparatus of claim 1, wherein the rendering engine is further configured to render the graphics content by decreasing one or more of a fidelity of the second portion, an amount of detail of the second portion, or a resolution of the second portion.

5. The apparatus of claim 1, wherein the rendering engine is further configured to render the graphics content by increasing one or more of a fidelity of the first portion, an amount of detail of the first portion, or a resolution of the first portion.

6. The apparatus of claim 1, wherein the evaluation metric is further based on a ranking of a bin that is part of the graphics content.

7. The apparatus of claim 1, wherein the evaluation metric is further based on a number of drawcalls in a bin that is part of the graphics content.

8. The apparatus of claim 1, wherein the evaluation metric is further based on a number of pixels to be shaded of a bin.

9. The apparatus of claim 1, wherein the evaluation metric is further based on a number of updated pixels associated with a bin that is part of the graphics content.

10. The apparatus of claim 1, wherein the evaluation metric is further based on a number of drawcalls associated with visible primitives of a bin.

11. The apparatus of claim 1, wherein the scene information includes a set of values associated with a triangle of the graphics content.

12. The apparatus of claim 11, wherein the set of values indicates a number of updated pixels associated with the triangle, a number of read texture samples associated with triangle, a triangle size of the triangle, a number of arithmetic logic unit (ALU) instructions associated with the triangle, one or more other parameters associated with the triangle, or a combination thereof.

13. The apparatus of claim 1, wherein the scene information indicates a drawcall pattern associated with frames of the graphics content.

14. A method of operation of a device, the method comprising:
generating an indication of a first portion of graphics content at a device based on scene information related to the graphics content, the graphics content further including a second portion; and
rendering the graphics content at the device based on comparing a first value of an evaluation metric associated with the graphics content with a second value of the evaluation metric, the first value associated with the first portion and the second value associated with the second portion, wherein the evaluation metric is based on at least one of a number of visible triangles associated with a bin of the graphics content, a number of pixels updated per triangle of the graphics content, a number of texture samples read per triangle of the graphics content, or a number of arithmetic logic unit (ALU) instructions associated per triangle or bin of the graphics content, wherein the graphics content is rendered using predictive adjustment based on the comparison.

15. The method of claim 14, further comprising receiving eye position information from a camera, wherein the first portion is identified further based on the eye position information.

16. The method of claim 14, wherein the scene information is received from a developer of the graphics content.

17. The method of claim 14, wherein the evaluation metric is further based on a number of visible drawcalls per bin of the graphics content, and further comprising identifying the first portion based on a number of visible drawcalls per bin of the first portion.

18. The method of claim 14, further comprising identifying the first portion based on a number of per bin of the first portion.

19. The method of claim 14, wherein the evaluation metric is further based on a number of pixels updated per bin of the graphics content, and further comprising identifying the first portion based on a number of updated pixels per bin of the first portion.

20. The method of claim 14, further comprising identifying the first portion based on a number of ALU instructions per bin of the first portion.

21. The method of claim 14, further comprising identifying the first portion based on a number of updated pixels per triangle of the first portion.

22. The method of claim 14, further comprising identifying the first portion based on a number of texture samples read per triangle of the first portion.

23. The method of claim 14, wherein the evaluation metric is further based on a triangle size associated with the graphics content, and further comprising identifying the first portion based on a triangle size of one or more triangles of the first portion.

24. The method of claim 14, further comprising identifying the first portion based on a number of ALU instructions per triangle of the first portion.

25. The method of claim 14, wherein the scene information is generated during a binning process, and wherein the first portion is foveated during a rendering process that occurs after the binning process.

26. The method of claim 14, further comprising receiving eye position information, wherein the first portion is identified further based on the eye position information.

27. The method of claim 14, wherein the graphics content is rendered using predictive adjustment to reduce latency associated with foveating the first portion, and further comprising, after rendering the graphics content, outputting the graphics content to be presented at a display device.

28. A method of operation of a device, the method comprising:
generating an indication of a first portion of graphics content at a device based on scene information related to the graphics content, the graphics content further including a second portion;
identifying a first set of drawcalls of a first frame of the graphics content;
identifying a second set of drawcalls of a second frame of the graphics content, the second set of drawcalls including at least one drawcall that is not included in the first set of drawcalls, wherein the first portion is identified in the second frame based on the at least one drawcall; and
rendering the graphics content at the device based on comparing a first value of an evaluation metric associated with the graphics content with a second value of the evaluation metric, the first value associated with the first portion and the second value associated with the second portion, wherein the first value is determined based at least in part on a number of pixels associated with the first portion that are updated during rendering of the graphics content.

29. An apparatus comprising:
means for generating an indication of a first portion of graphics content based on scene information related to the graphics content, the graphics content further including a second portion; and
means for rendering the graphics content based on comparing a first value of an evaluation metric associated with the graphics content with a second value of the evaluation metric, the first value associated with the first portion and the second value associated with the second portion, wherein the evaluation metric is based on at least one of a number of visible triangles associated with a bin of the graphics content, a number of pixels updated per triangle of the graphics content, a number of texture samples read per triangle of the graphics content, or a number of arithmetic logic unit (ALU) instructions associated per triangle or bin of the graphics content, and wherein the means for rendering is configured to render the graphics content using predictive adjustment based on the comparison.

30. The apparatus of claim 29, further comprising means for performing a binning process associated with processing of the graphics content and for determining the scene information during the binning process.

* * * * *